3,237,988
DUMPING VEHICLE FOR INTERCHANGEABLE
TILTING VESSELS
Ernest E. Esgate, Detroit, Mich., assignor to Edward C.
Levy Company, Detroit, Mich., a corporation of
Michigan
Filed Sept. 26, 1962, Ser. No. 226,301
5 Claims. (Cl. 298—5)

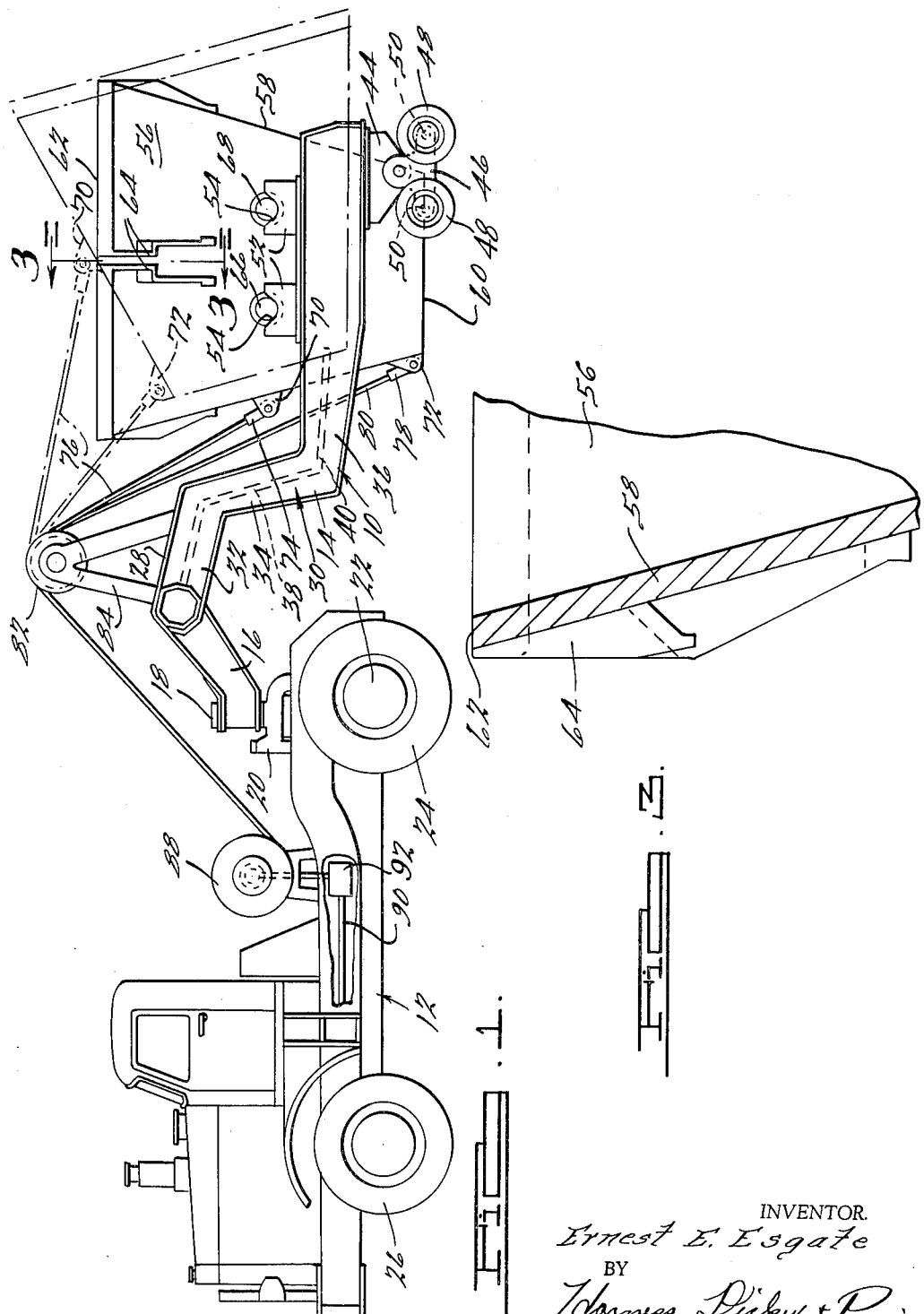

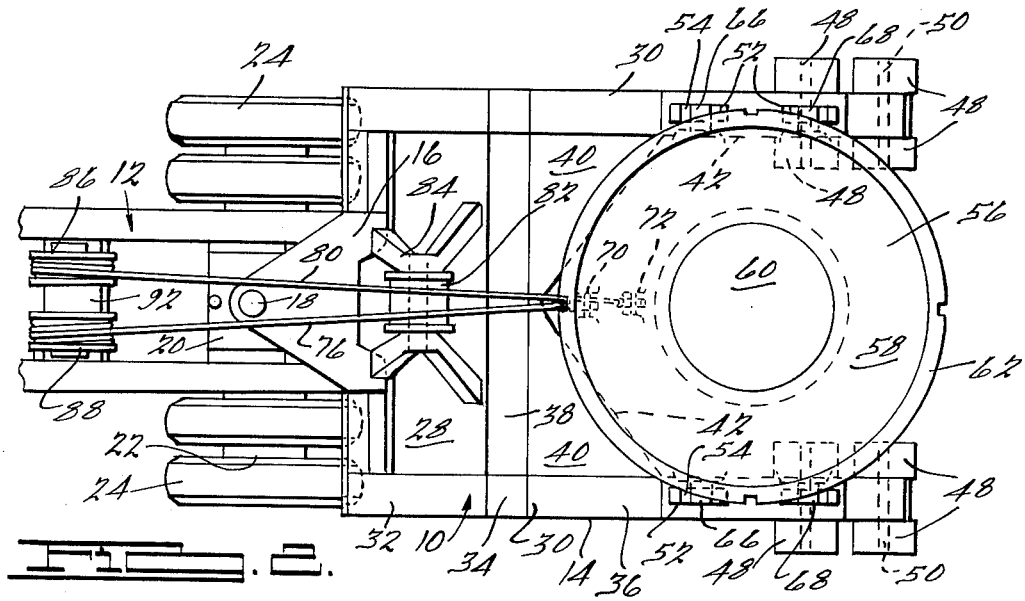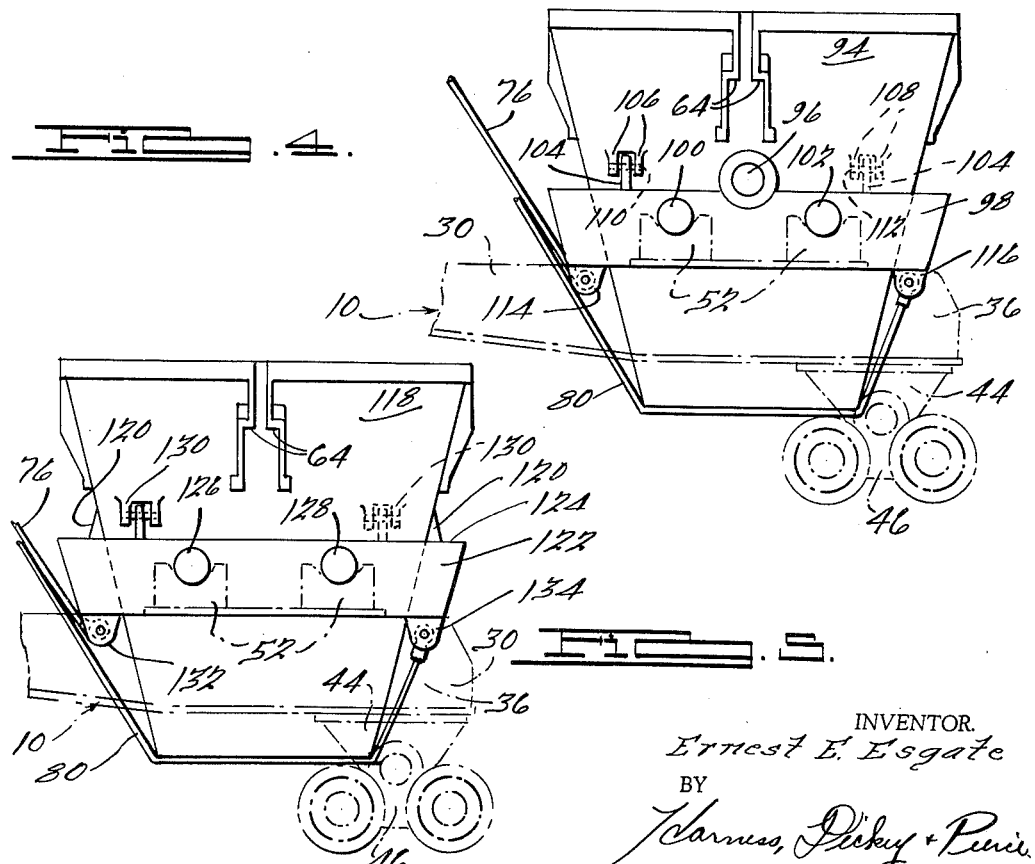

This invention relates to vehicles for transporting and dumping large vessels and particularly to a vehicle capable of movement over pavement, earth or the like, for carrying and dumping slag pots.

It is an object of the present invention to provide a vessel transporting and dumping vehicle which is capable of handling very heavy loads, which is capable of movement over pavement or the ground and which is capable of handling extremely hot materials, such as molten slag.

It is another object of the present invention to provide a vehicle of the above character having a vessel dumping mechanism which is of simple mechanical construction, which eliminates the use of hydraulic conduits and other parts and materials presenting special problems when used in high temperature environments, and which is capable of exercising complete control over the vessel during the dumping thereof.

It is another object of the present invention to provide a vehicle of the above character which dumps the material carried by the vessel completely clear of the vehicle.

It is another object of the present invention to provide a vehicle of the above character which is capable of handling all known presently used slag pots by the use of simple adapters or minor modification of the slag pots.

It is a further object of the present invention to provide a vehicle of the above character which is capable of unloading a slag pot or other large vessels being transported in any selected location without the use of an overhead crane or hoist.

It is still another object of the present invention to provide a vehicle of the above character which may be made in the form of a trailer and driven by a standard truck tractor.

It is another object of the present invention to provide a vehicle of the above character which is highly stable, which is durable, which may be made at a low cost compared to vehicles capable of handling similar loads, which is safe, and which is highly mobile.

These and other objects of the present invention will become apparent from the following detailed description, taken in conjunction with the accompanying drawings, wherein:

FIGURE 1 is a side elevational view of a vehicle made in accordance with the present invention;

FIG. 2 is a fragmentary plan view of the structure illustrated in FIG. 1;

FIG. 3 is an enlarged fragmentary sectional view of the structure illustrated in FIG. 1, taken along the line 3—3 thereof;

FIG. 4 is a fragmentary view of structure similarly illustrated in FIG. 1 showing the use of the vehicle with a slag pot having a somewhat different construction from the slag pot shown in FIG. 1; and FIG. 5 is a view of structure similarly illustrated in FIG. 4 showing the use of the vehicle with still another form of slag pot.

While the vehicle of the present invention may be constructed in a single unit, it is desirably formed in two sections, including a trailer 10 and a tractor 12. The trailer 10 includes a frame 14 having a yoke portion 16 extending forwardly and downwardly at the forward end thereof and adapted for connection to a kingpin 18 supported on a kingpin mounting plate 20 substantially above the rear axle 22 of the tractor 12. The tractor 12 has a pair of wheels 24 on each side of the rear axle 22 and a pair of front wheels 26, each of said wheels having the usual pneumatic tires.

As seen in FIGS. 1 and 2, the trailer frame 14 includes a raised cross member 28 which interconnects the forward ends of two side frame members 30 disposed on opposite sides of the frame 14. Each side frame member 30 includes a raised portion 32, a portion 34 extending downwardly and rearwardly from the raised portion 32 and a horizontally extending main portion 36. A brace 38 is welded to the cross member 28 and is provided at its opposite sides with portions 40 which extend rearwardly and outwardly toward the side frame members 30. The brace portions 40 are welded to the side frame member portions 36 to prevent flexure thereof toward and away from one another. The portion of the frame 14 at the rear of the trailer 10 is of generally U-shape, defining a central opening or area 42 which is bottomless and is open to the rear of the trailer 10.

Each side frame member portion 36 is provided on its underside with an axle support 44 which supports an axle housing or wheel support member 46 for oscillatory movement about a horizontal transverse axis. While the details of construction of the axle housing members 46 are not illustrated, they serve to support a pair of solid rubber-tired wheels 48 on each of two transverse axles 50 which are capable of movement about a longitudinal horizontal axis. Thus, each pair of wheels 48 is movable vertically with respect to each of the other wheels, so that the four wheels 48 carried by each axle support 44 can accommodate themselves to any gentle rolling curvature of the terrain on which the vehicle is driven to maintain engagement of all the wheels with the ground at all times.

Mounted on the upper side of each of the main side frame member portions 36 are a pair of trunnion support blocks 52 having arcuate recesses 54 on the upper surfaces thereof. The blocks 52 serve to support a large vessel or slag pot 56 having an enclosing frusto-conical side wall 58 which extends in an upwardly and outwardly diverging direction. The pot 56 is closed at its bottom 60 but is open at its top 62. Brackets 64 are provided on the outer surface of the side wall 58 adjacent the upper end thereof for the reception of hooks (not shown) adapted to be suspended from an overhead crane or hoist by means of which the pot 56 may be lowered onto or removed from the trailer 10. In addition, the pot 56 is provided with two pairs of oppositely extending trunnions, including a first forward pair of trunnions 66 disposed one on each side of the pot 56 and a second rearward pair of opposite trunnions 68, disposed one on each side of the pot 56. Each of the trunnions 66 and 68 will be seen to rest in a recess 54 of a trunnion support block 52.

While resting in the position shown in solid lines in FIG. 1, the slag pot 56 is in readiness for pivotal movement about the axis of its rear pair of trunnions 68, said axis extending horizontally and transversely of the trailer 10. For the purpose of accommodating the mechanism by which it is pivoted, the pot 56 includes a first pair of apertured lugs 70 and a second pair of apertured lugs 72. The first pair of lugs 70 is located on the outer surface of side wall 58 generally half way between the bottom 60 and top 62 of the pot 56, whereas the second pair of lugs 72 is located adjacent the bottom 60 of the pot 56. A fitting 74, secured to the end of a first flexible cable 76, is pivotally fastened between the first pair of lugs 70, whereas a fitting 78, on the end of a second flexible cable 80, is pivotally fastened between the second pair of lugs 72. The cables 76 and 80 are trained over an idler pulley 82 rotatably supported on a bracket 84 on the forward portion of the trailer 10 at a level at which its periphery extends above the level of pot 56. The cables 76 and 80 are wound around a pair of winch drums 86 and 88, respectively. The drums 86 and 88 are driven by the tractor engine through a drive mechanism 90 and a gear reduction and clutch mechanism 92 providing individual control of each of the drums 86 and 88. By winding in on the cable 80, that part of the pot 56 in the area of the pair of lugs 72 will be raised and the rearmost portion of the top 62 of the pot 56 will be tipped downwardly and rearwardly to dump the contents of the pot 56 onto the ground. When the center of gravity of the pot 56 and its contents passes rearwardly of a vertical plane including the axis of the trunnions 68, the weight of the pot 56 will be taken by the cable 76, which is maintained taut at all times. Thereafter, further tipping of the pot 56 will be controlled by the cable 76. It will therefore be appreciated that during the dumping of the pot 56, the pot is always under control of one of the cables 76 or 80—one of said cables always being under tension.

As is illustrated in FIG. 1, the portion of the top 62 of the pot 56 which forms the pouring lip is spaced completely rearwardly of the trailer 10. It is thus assured that no molten slag or other material being handled will come into contact with the vehicle. All of the material dumped can be deposited in the location desired and one will be left in the vehicle, where it might cause damage. Additionally, it will be seen that the point of pivotal connection of the axle housing member 46 to the axle support 44 is located readwardly of a vertical transverse plane intersecting the axis of the trunnions 68. By this means, the weight of the pot 56 and its contents is always supported between the wheels 48 and the tractor wheels 24. Thus, through the transporting of the vessel and during its dumping, the vehicle remains completely stable and the tilting of the pot 56 has no tendency to tip the trailor 10. It will also be seen that the pot 56 is carried very close to the ground, with the bottom of the pot 56 extending beneath the level of the side frame members 30. This also enhances the stability of the structure.

One of the advantageous features of the vehicle of the present invention is the ability to unload the vessel without the use of a crane or overhead hoist. In the handling of molten slag, for example, it occasionally happens that the slag will stick in a particular pot 56 and will not pour out properly. Under such circumstances, it is desirable to set the pot to one side, permit it to cool, and subsequently remove the slag by mechanical means. In the use of the vehicle of the present invention, this may be accomplished by driving the vehicle to a convenient location and jacking up the trailer 10 an amount slightly greater than the depth of the trunnion support block recesses 54, as, for example, six inches. Blocks are then placed under the pot bottom 60 to support the pot 56 at this height. The trailer 10 is then lowered onto the ground, the fittings 74 and 78 unfastened and the trailer 10 driven away. Any suitable heavy-duty jacks can be used for this function and the entire operation can be executed in a very few minutes.

By way of example, a trailer 10 has been designed for use with a slag pot 56 having a diameter at its bottom 60 of five (5) feet, a diameter at its top 62 of eleven (11) feet and a capacity of 480 cubic feet. This particular trailer is designed for total pay loads (the pot 56 and its contents) having a weight up to 150,000 pounds. The molten slag which the vehicle is designed to handle has a temperature of 3000° F. It is believed that the vehicle of the present invention is ideally suited to handle such heavy, high temperature loads with a maximum of mobility, safety and convenience. The wheels 48 are adapted to carry solid rubber tires and, thus, if they come into contact with hot slag, this would not result in a "blowout." From the standpoint of convenience, it will also be noted that the trailer 10 possesses a width which is only slightly greater than the pot 56 itself, which permits the trailer 10 to be drawn to practically any location that will accommodate a pot 56.

Another feature of the vehicle of the present invention resides in its ability to accommodate vessels of varying design. FIGS. 4 and 5 illustrate the trailer 10 supporting slag pots of a somewhat modified configuration. Referring particularly to FIG. 4, a pot 94 is illustrated having a single pair of diametrically opposite trunnions 96. In order to support the pot 94 on the trailer 10, an adapter ring 98 is utilized having a first pair of opposite trunnions 100 and a second pair of opposite trunnions 102 adapted to seat in the trunnion support blocks 52. The outer surface of the enclosing wall of the pot 94 seats aganist the inside surface of the ring 98 and the ring 98 is cut out to conformably engage the trunnions 96. When properly angularly aligned with the pot 94, a pair of upstanding lugs 104 on the ring 98 are received between two pairs of apertured ears 106 and 108 on the pot. By this means, locking pins 110 and 112 may be utilized to secure the pot 94 to the ring 98.

The ring 98 has a depending apertured lug 114 on the forward side thereof and a depending apertured lug 116 on its diametrically opposite or rear side. The lug 114 is connected to the cable 76 and the cable 80 is run under the bottom of the pot 94 and is connected to the lug 116. By retrieving the cables 80 and/or 76, the pot 94 may be dumped in the same manner as the pot 56 illustrated in FIG. 1.

FIG. 5 illustrates a trunnionless pot 118 having a pair of hook receiving portions 120 on diametrically opposite sides thereof. The pot 118 is similarly of inverted frustoconical shape and seats against the inside diameter of an adapter ring 122, while the portions 120 rest on the upper surface 124 of the ring 122. The ring 122 has outwardly projecting pairs of trunnions 126 and 128 seated on the trunnion support blocks 52. Locking means 130, similar to that shown in FIG. 4, are provided for securing the ring 122 to the pot 118. A pair of lugs 132 and 134 are formed on opposite sides of the ring 122 for connection to the cables 76 and 80, respectively, to pivotally move the pot 118 about the axis of the trunnions 128.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. Apparatus for handling large loads of pourable materials including a rigid trailer frame adapted to be pulled by a tractor or the like through a vertical kingpin connection at its forward end, said trailer having a pair of transversely spaced rearwardly extending side frame members defining a rearwardly open opening therebetween, a separate wheel support member disposed beneath each side frame member adjacent the rear end thereof, each wheel support member carrying a plurality of wheels and being connected to its adjacent side frame member for pivotal movement about a transverse axis, a journal support on each side frame member and a vessel disposed between said side frame members and extending below the level of said side frame members, said vessel having journals resting on said journal supports and supporting said vessel for pivotal movement about a transverse axis to pour material rearwardly from said vessel, said journal transverse axis being located with respect to said wheel support member axis so that the portion of said vessel from which material is poured moves rearwardly of the wheels carried by said wheel support member during pouring and the center of gravity of a loaded vessel is located forwardly of said wheel support member transverse axis when said vessel is in an upright position.

2. Apparatus for handling large loads of pourable materials including a rigid trailer frame adapted to be pulled by a tractor or the like through a vertical kinkpin connection at its forward end, said trailer having a pair of transversely spaced rearwardly extending side frame members defining a rearwardly open opening therebetween, a separate wheel support member disposed beneath each side frame member adjacent the rear end thereof, each wheel support member carrying a plurality of wheels and being connected to its adjacent side frame member for pivotal movement about a transverse axis, a journal support on each side frame member, a vessel disposed between said side frame members and extending below the level of said side frame members, said vessel having journals resting on said journal supports and supporting said vessel for pivotal movement about a transverse axis to pour material rearwardly from said vessel, said journal transverse axis being located with respect to said wheel support member axis so that the portion of said vessel from which material is poured moves rearwardly of the wheels carried by said wheel support member during pouring and the center of gravity of a loaded vessel is located forwardly of said wheel support member transverse axis when said vessel is in an upright position, and two cables connected to said vessel at vertically spaced locations whereby said vessel may be pivoted to pour material therefrom by pulling on one of said cables and returned to an upright position by pulling on the other of said cables.

3. Apparatus for handling large loads of pourable materials including a rigid trailer frame adapted to be pulled by a tractor or the like through a vertical kingpin connection at its forward end, said trailer having a pair of transversely spaced rearwardly extending side frame members defining a rearwardly open opening therebetween, a separate wheel support member disposed beneath each side frame member adjacent the rear end thereof, each wheel support member carrying a plurality of wheels and being connected to its adjacent side frame member for pivotal movement about a transverse axis, a journal support on each side frame member, a vessel disposed in said opening between said wheel support members, said vessel having a conical enclosing side wall, the upper portion of said side wall being disposed over at least some of the wheels carried by said wheel support members and a pair of journals projecting from opposite sides of said side wall and resting on said journal supports to support said vessel for pivotal movement about a transverse axis whereby material may be poured rearwardly from said vessel, said journal transverse axis being located with respect to said wheel support member axis so that the portion of said vessel from which material is poured moves rearwardly of the wheels carried by said wheel support member during pouring and the center of gravity of the loaded vessel is located forwardly of said wheel support member transverse axis when said vessel is in an upright position.

4. Apparatus for handling large loads of pourable materials including a rigid trailer frame adapted to be pulled by a tractor or the like through a vertical kingpin connection at its forward end, said trailer having a pair of transversely spaced rearwardly extending side frame members defining a rearwardly open opening therebetween, a separate wheel support member disposed beneath each side frame member adjacent the rear end thereof, each wheel support member carrying a plurality of wheels and being connected to its adjacent side frame member for pivotal movement about a transverse axis, a journal support on each side frame member, and a vessel disposed between said side frame members and extending below the level of said side frame members, said vessel having journals resting on said journal supports and supporting said vessel for pivotal movement about a transverse axis to pour material rearwardly from said vessel, said journal transverse axis being located with respect to said wheel support member axis so that the portion of said vessel from which material is poured moves rearwardly of the wheel carried by said wheel support member during pouring and the center of gravity of a loaded vessel is located forwardly of said wheel support member transverse axis when said vessel is in an upright position, said trailer frame opening being free of obstructions beneath said vessel whereby said trailer frame can be pulled away from said vessel when said vessel is supported from beneath so as to hold said journals above said journal supports.

5. Apparatus for handling large loads of pourable materials including a rigid trailer frame adapted to be pulled by a tractor or the like through a vertical kingpin connection at its forward end, said trailer having a pair of transversely spaced rearwardly extending side frame members defining a rearwardly open opening therebetween, a separate wheel support member disposed beneath each side frame member adjacent the rear end thereof, each wheel support member carrying a plurality of wheels and being connected to its adjacent side frame member for pivotal movement about a transverse axis, a pair of journal supports on each side frame member, and a vessel disposed in said opening between said wheel support members, said vessel having a pair of longitudinally spaced journals on one side thereof and a pair of longitudinally spaced journals on the other side thereof, said journals resting on said journal supports to support said vessel in an upright position, said vessel being pivotal about a transverse axis defined by one journal on each side thereof for pouring material rearwardly from said vessel, said journal transverse axis being located with respect to said wheel support member axis so that the portion of said vessel from which material is poured moves rearwardly of the wheels carried by said wheel support member during pouring and the center of gravity of the loaded vessel is located forwardly of said wheel support member axis when said vessel was in an upright position.

References Cited by the Examiner

UNITED STATES PATENTS

| | | | |
|---|---|---|---|
| 294,142 | 2/1884 | Mavor | 298—1 |
| 328,981 | 10/1885 | Sturgis | 298—1 |
| 670,315 | 3/1901 | Eynon | 298—1 |
| 2,235,795 | 3/1941 | Blest et al. | 105—272 |
| 2,601,163 | 6/1952 | Miller | 298—1 |
| 3,065,993 | 11/1962 | Schramm | 298—22 X |

FOREIGN PATENTS

| | | |
|---|---|---|
| 38,750 | of 1907 | Switzerland. |
| 1,120,472 | 4/1956 | France. |

ARTHUR L. LA POINT, *Primary Examiner.*

LEO QUACKENBUSH, MILTON BUCHLER,
*Examiners.*